(12) United States Patent
Forbush et al.

(10) Patent No.: US 7,639,394 B2
(45) Date of Patent: Dec. 29, 2009

(54) DYNAMICALLY GENERATING DARKER AND LIGHTER COLOR OPTIONS FROM A BASE COLOR IN A COLOR PICKER USER INTERFACE

(75) Inventors: Lesley Forbush, Fremont, CA (US); Keri Vandeberghe, Seattle, WA (US); Tseng Hui Ni, Saratoga, CA (US); Howard L. Cooperstein, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 627 days.

(21) Appl. No.: 11/395,830

(22) Filed: Mar. 31, 2006

(65) Prior Publication Data

US 2007/0229861 A1 Oct. 4, 2007

(51) Int. Cl.
*H04N 1/40* (2006.01)
(52) U.S. Cl. .......................... 358/1.9; 358/2.1; 358/518
(58) Field of Classification Search .................. 358/1.9, 358/2.1, 1.18, 500–501, 504, 516, 518, 530
See application file for complete search history.

(56) References Cited

U.S. PATENT DOCUMENTS 6,771,816 B1 * 8/2004 Gaither ...................... 382/176

OTHER PUBLICATIONS

Maloney, John, "An Introduction to Morphic: The Squeak User Interface Framework," Walt Disney Imagineering, pp. 1-38.
Nissley, Victoria, "Pennsylvania Dynamic Site Framework (PA DSF) DSF System/Site Administrator Training Manual," Commonwealth of Pennsylvania, 148 pgs., http://scholar.google.com/scholar?hl=en&lr=&q=cache:mFREAZ0E14YJ:www.oit.state.pa . . . , Jan. 10, 2006.
"Customizing Mozilla," http://www.mozilla.org/unix/customizing.html, pp. 1-24, Jan. 10, 2006.

* cited by examiner

*Primary Examiner*—Thomas D Lee
*Assistant Examiner*—Stephen M Brinich
(74) *Attorney, Agent, or Firm*—Merchant & Gould P.C.

(57) ABSTRACT

Methods, systems, and computer program products generate lighter or darker color options from one or more base colors to apply to a document. A method involves enabling a color picker user interface (UI) according to developer specifications, receiving a user request to view the color picker UI, and determining a current color scheme for the document. The method further involves deriving lighter color options and/or darker color options from one or more base colors associated with the current color scheme and rendering the color picker UI including the lighter color options and/or the darker color options derived from the base colors associated with the current color scheme. The current color scheme includes color options that definitively or aesthetically compliment one another.

19 Claims, 5 Drawing Sheets

DYNAMICALLY GENERATING DARKER AND LIGHTER COLOR OPTIONS FROM A BASE COLOR IN A COLOR PICKER USER INTERFACE

COPYRIGHT NOTICE

A portion of the disclosure of this patent document contains material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

BACKGROUND

With the advent of the computer age, computer and software users have grown accustomed to software applications that help them prepare presentations and documents with impressive colors and graphic effects. For example, modern electronic word processing and/or presentation applications allow users to select and apply a variety of colors to documents via color picker user interfaces (UIs). However, conventional color picker UIs look outdated and provide an inconsistent experience for a user even across an application suite. Also, it is difficult for users to understand distinctions between the different lines of colors in an initial drop down view. Additionally, with certain applications, users have no way to preview a new color within the document before closing out of the dialog box.

Conventional color pickers either do not offer enough colors from which users can choose or in an attempt to cover a radius hue of all colors, offer too many inconsistent colors such that the documents created are not aesthetically pleasing.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing for dynamically generating lighter and darker color options from a base color scheme. According to an embodiment of the invention, applications in conjunction with a universal theme aware color picker component dynamically generate lighter and/or darker color options from a base color scheme to complete the set of theme colors. This mechanism provides theme colors up front thus, allowing users to more easily create aesthetically pleasing or "good looking documents". Added light and/or dark options based on the scheme base colors provide more complimentary colors to users, which are lighter and darker versions of the base color. Thus, users are given access to a variety of colors but are still constrained in the sense of what types of colors they are using.

Embodiments of the present invention also include labels or tool tips to help users distinguish between different colors and a live preview feature to allow users to view a color change on a document before the change is stored as applied. The color picker component is universal and thus, used across a variety of applications for consistency. The color picker component also adapts colors to a user's current color scheme by retrieving or pulling from style sheets associated with the user's current application. Embodiments of the present invention allow a user to define custom colors and/or select from standard colors or more colors outside of the theme colors. This mechanism also provides for users to have quick access to their last used colors.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention dynamically generate lighter and darker color options from a base color and/or color scheme. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
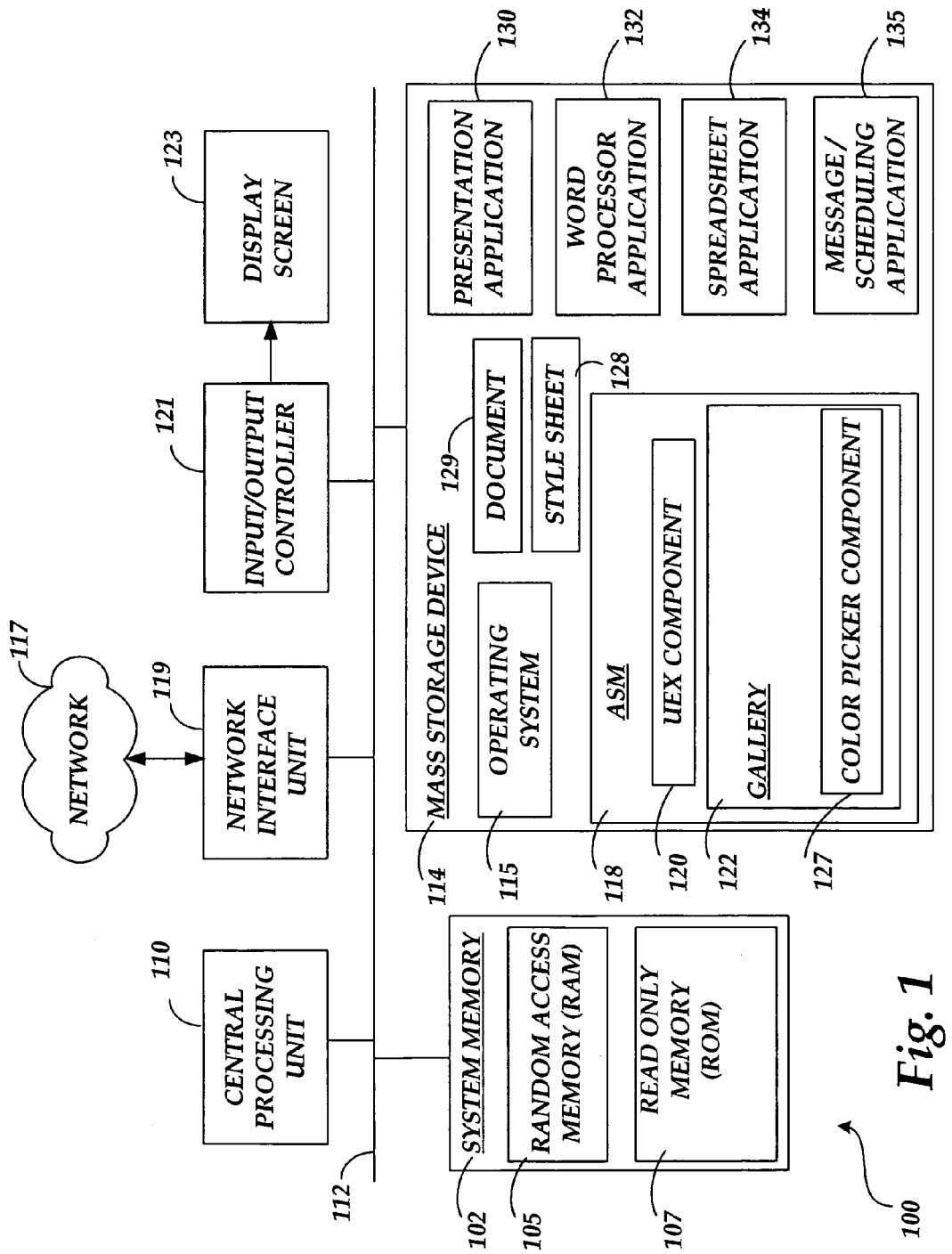
FIG. 1 illustrates an exemplary computing system.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

With reference to FIG. 1, one exemplary system for implementing the invention includes a computing device, such as computing device 100. In a basic configuration, the computing device 100 typically includes at least one processing unit 110, system memory 102, and a mass storage device (MSD) 114. Depending on the exact configuration and type of computing device, the system memory 102 may be volatile (such as RAM 105), non-volatile (such as ROM 107, flash memory, etc.) or some combination of the two. The MSD 114 typically includes an operating system 115 suitable for controlling the operation of a networked personal computer, such as the WINDOWS® operating systems from MICROSOFT CORPORATION of Redmond, Wash. The MSD 114 may also include one or more software applications 130, 132, 134 and 135 working in conjunction with an application suite module (ASM) 118. The ASM 118 includes a user experience (UEX) component 120 and a gallery 122 including a color picker component 127.

According to embodiments of the invention, the software applications may comprise many types of programs, such as an electronic mail program, a calendaring program, an Internet browsing program, and the like. An example of such programs is OUTLOOK® manufactured by MICROSOFT CORPORATION. The applications may also comprise a multiple-functionality software application for providing many other types of functionalities. Such a multiple-functionality application may include a number of program modules, such as a word processor program 132, a spreadsheet program 134, a slide presentation program 130, an electronic messaging/scheduling program 135, and the like. An example of such a multiple-functionality application is OFFICE™ manufactured by MICROSOFT CORPORATION. According to embodiments of the present invention, the applications are illustrative of any software application working in conjunction with the color picker component 127 to generate or derive lighter color options and/or darker color options from a base color to be selected and applied to documents, such as a document 129 generated by one of the software applications 130, 132, 134 or 135.

The software applications 130, 132, 134 or 135 work in conjunction with the color picker component 127 to generate and render theme colors via a display device 123. A gallery 122 is a container that fortifies the UEX component 120. The UEX component 120 provides one or more containers from which developers can build in the UI. The color picker component 127 tells the gallery 122 what kind of data to put into the gallery 122, such as what colors to pull from a style sheet 128 containing multiple styles or another source, such as system colors. It should be appreciated that the UEX component 120 can be called in to directly by the applications 130, 132, 134 or 135. Not all UEX components reside in the ASM 118. Although there may be multiple galleries that are different than color pickers and don't necessarily live in the ASM 118, the color picker component 127 builds off of these multiple galleries. UEX owns the gallery 122 container as well as a variety of different UIs. The style sheet 128 is an XML based file that gives a description of a set of colors and fonts. The style sheet 128 defines the color, font, and also the effects that apply to a particular style, such as 3D, reflection, or glow.

The color picker component 127 allows users to pick colors from it. The software applications call into the UEX's gallery 122 via an entry point to get instructions as to how to draw, display, or render the color picker UI. When color options are highlighted and/or selected they are used in the UEX. A software application tells the color picker component 127 what color is desired and what kind of entry points should be rendered via the color picker UI.

The MSD 114 is connected to the CPU 110 through a mass storage controller (not shown) connected to the system bus 112. The MSD 114 and its associated computer-readable media, provide non-volatile storage for the computing device 100. Although the description of computer-readable media contained herein refers to a MSD, such as a hard disk or RAID array, it should be appreciated by those skilled in the art that computer-readable media can be any available media that can be accessed by the CPU 110.

The CPU 110 may store data to and access data from the MSD 114. Data is transferred to and received from the MSD 114 through the system bus 112. The CPU 110 may be a general-purpose computer processor. Furthermore, as mentioned below, the CPU 110, in addition to being a general-purpose programmable processor, may be firmware, hard-wired logic, analog circuitry, other special purpose circuitry, or any combination thereof.

According to various embodiments of the invention, the computing device 100 can operate in a networked environment, as shown in FIG. 1, using logical connections to remote computing devices via network communication, such as an Intranet, or a local area network (LAN). The computing device 100 may connect to the network 117 via a network interface unit 119. It should be appreciated that the network interface unit 119 may also be utilized to connect to other types of networks and remote computer systems. The computing device 100 also includes an input/output controller 121 for receiving and processing input from a number of devices, including a keyboard (not shown). Similarly, the input/output controller 121 provides output to a display screen 123, a printer, or other type of output device.

A computing device, such as the computing device 100, typically includes at least some form of computer-readable media. Computer readable media can be any available media that can be accessed by the computing device 100. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, disk drives, a collection of disk drives, flash memory, other memory technology or any other medium that can be used to store the desired information and that can be accessed by the computing device 100.

Figure 2:
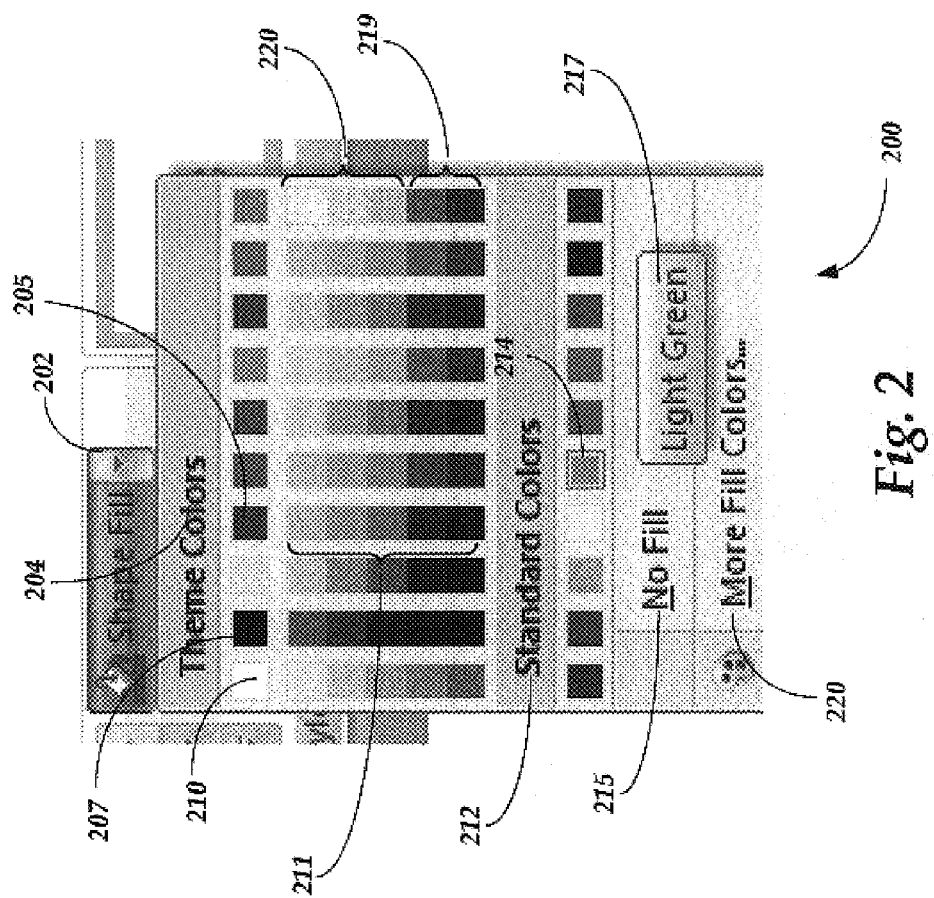
FIG. 2 illustrates a color picker user interface (UI) rendering lighter and darker color options derived from a base color scheme.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

FIG. 2 illustrates a color picker UI 200 rendering lighter and darker color options, such as lighter/darker options 211, derived from a base color scheme including base colors 207, 210, and 205. Theme colors 204 pull from the currently loaded style sheet 128. In a scheme, there are 12 main colors defined, typically one slot is black color 207, one slot is white color 210, and two slots are hyperlink colors. An initial drop down or color picker UI 200 exposes the first 10 slots (which typically include black and white). The two hyperlink colors become visible in a color scheme picker or in the document 129 as a user creates hyperlinks. Each of the base 10 colors are displayed horizontally along the top of the color picker UI 200 with a label of "Theme Colors" above them. There is a space between these colors as well as a space between each of them and the start of their lighter and darker variants.

When pulling from the style sheet 128, the color picker UI 200 displays what colors are available. If there are no theme colors defined, then the color picker UI 200 may not show that section (including calculated lighter variants/darker variants). If there are no custom colors defined, then the color picker UI 200 may not show that section either. A hard coded set of theme colors is provided, such that a partial theme set loaded in the style sheet is avoided. Even if a designer creates a set with less than the predefined quantity of colors, the code has a hard-coded color scheme to use to fill in the slots not defined.

Once a shape or text section of a document is selected for color application, the color picker UI 200 is accessed via user selection of a shape fill request 202. Each base color is utilized to calculate lighter color options and/or darker color options, for example lighter options 219 and darker options 220, to provide a variety of color options. The calculated color options are similar to colors already displayed in the document, for example a presentation. The color picker UI 200 shows 3 lighter variants 220 and 2 darker variants 219 for each base color (other than black/white or colors in the luminance extreme: less than 0.2 or greater that 0.8). The column order in the color picker UI 200 from top to bottom (for colors other than black/white or colors in the luminance extreme): Lightness 20%, Lightness 0%, Lightness 60% continuing with Darkness at 75% and 50%. These lighter and darker values are calculated using the following equations:

Given: a BASE Color X with (Rx, Gx, Bx) as a RGB value and a lightness percentage T (0-100)

Determine luminance value from BASE color using a standard equation to convert from RGB space to Hue Saturation Luminance (HSL); call that value Lx.
  A lighter Ly variant would be: $Ly=(1-T/100)*(255-Lx)+Lx$
  Convert back to RGB space using new luminance value Ly
  Result: a lightened Color Y with (Ry, Gy, By) as a RGB value
  Given: a BASE Color X with (Rx, Gx, Bx) as a RGB value and a darkness percentage S (0-100)
  Determine luminance value from BASE color using a standard equation to convert from RGB space to HSL; call that value Lx.
  A darker Lz variant would be: $Lz=Lx-(1-S/100)*Lx$
  Convert back to RGB space using new luminance value Lz
  Result: a darkened Color Z with (Rz, Gz, Bz) as a RGB value There are two caveats to the above calculations:
(1) For Black and White, a detection that is aware of whether the well is black or white is provided. For black all lighter variants are calculated and for white all darker variants are calculated using the above lighten/darken techniques as follows:
  White (in this order from top down): Darkness 95%, Darkness 85%, Darkness 75%, Darkness 65%, Darkness 50%
  Black (in this order from top down): Lightness 50%, Lightness 65%, Lightness 75%, Lightness 85%, Lightness 95%
(2) For any color with luminance less than 0.2 or greater than 0.8 (other than black and white), all darker or all lighter variants are calculated. If that is the case, then the color has the following calculations:
  For color with less than 0.2 luminance: Lightness 10%, Lightness 25%, Lightness 50%, Lightness 75%, Lightness 90%
  For color with greater than 0.8 luminance: Darkness 90%, Darkness 75%, Darkness 25%, Darkness 25%, Darkness 10%
  Note* There are standard well understood equations for converting between RGB and HSL and RGB space. These standard equations are not included in this document.

The color picker UI 200 may also provide a section of standard colors 212 for selection by a user. The standard colors do not necessarily follow theme colors and when selected, will apply an RGB color to the selected object. The color picker UI 200 denotes which color is currently applied, as there is a selection marker 214 around a color option well. A tool tip 217 of either text or RGB values is rendered to help a user distinguish between the colors. RGB values for the standard colors 212 are as follows: Dark Red-192, 0, 0; Red-255, 0, 0; Orange-255, 192, 0; Yellow-255, 255, 0; Light Green-146, 208, 80; Green-0, 176, 80; Light Blue-0, 176, 240; Blue-0, 112, 192; Dark Blue-0, 32,96; and Purple-112, 48, 160.

Tooltips for the theme section of the color picker UI are rendered in text as follows: (from left to right) Text/Background 1; Text/Background 2; Text/Background; Text/Background 4; Accent 1; Accent 2; Accent 3; Accent 4; Accent 5; and Accent 6. The tint/shade area of the color picker UI 200 tool tip should show respectively
  Tint n %
  Shade n %

When 'Tint' and 'Shade' are used as tooltips, it should be understood that 'Tint' and 'Shade' refer to lighter and darker variants of a base color. It is not intend for a direct dictionary definition to be applied of only adding white or black respectfully. Custom and standard colors pull their tool tip name from the style sheet 128 and when a name is not present the tool tip will render a RGB value. The recent colors (FIG. 3) section will render RGB values.

Figure 3:
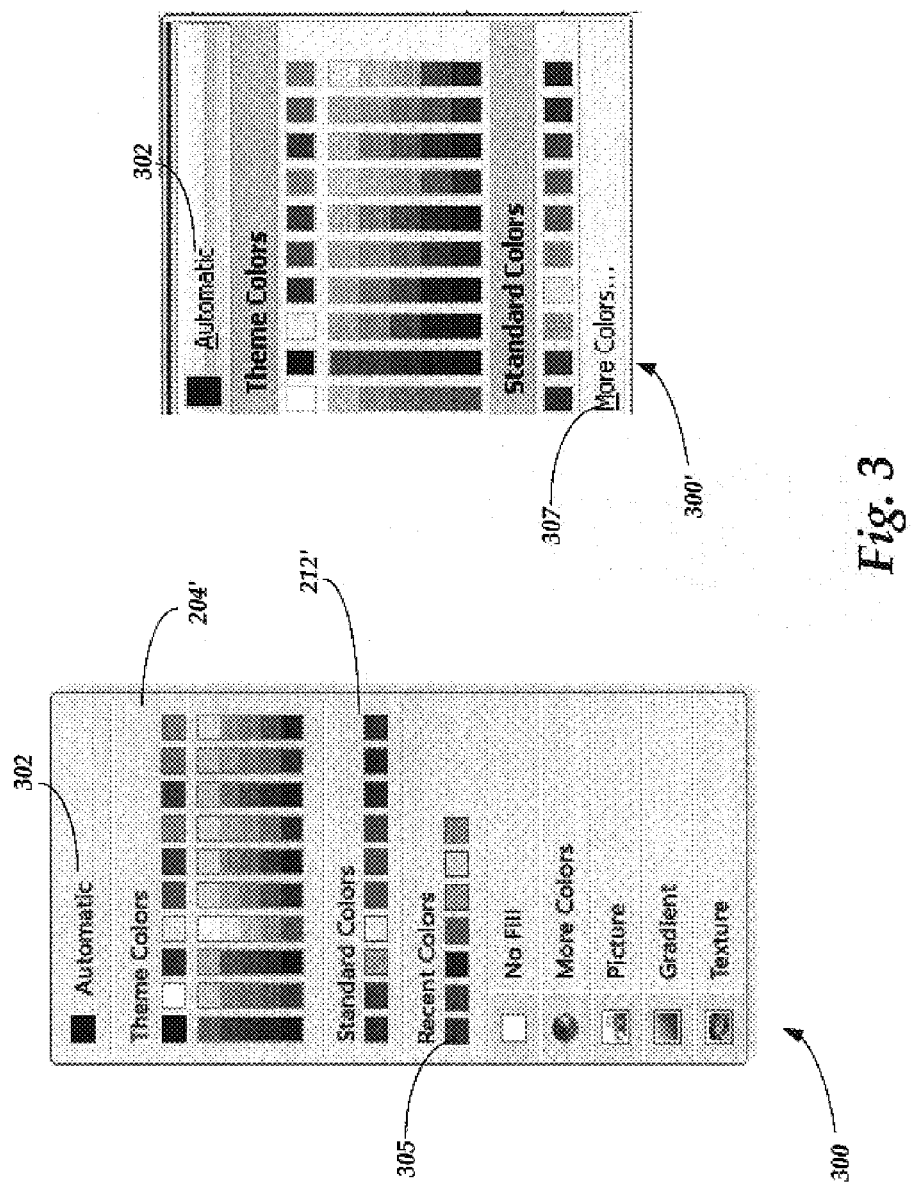
FIG. 3 illustrates alternative color picker UIs.

Regardless of which theme color 204, the user selects, it should be aesthetically pleasing with the rest of the colors. However, if the user does not see a color that suits her desire, she may select a "More Colors" selection 220 from the color picker UI 200. Once a color is selected via the "More Colors" selection 220 and dialog the color may be added to a "Recent Colors" section of a color picker UI (FIG. 3). The user may also choose a new set of colors to display in the color picker via a separate base color scheme picker. Upon selection the color picker component 127 updates colors in the document 129 and the color picker UI 200. A user can even create their own unique set of scheme colors to display in the document 129 and the color picker UI 200. Recently used colors may still remain in a "Recent Colors" section.

FIG. 3 illustrates alternative color picker UIs 300 and 300'. The color picker UIs 300 and 300' both render "Automatic" functionality 302 and 302'. However, the color picker UI 300 is a dropdown UI whereas the color picker UI 300' is a dialog UI. Either UI can be designated or enabled by a creating developer. The "Automatic" functionality retrieves color designations from a current style or from system colors instead of from a style sheet. Individual color picker entry points may adapt "Automatic" functionality as desired. When an instance of the color picker is declared, then developers have the option to have the automatic field pull values from wherever they specify. The color picker UI 300 includes theme colors 204' and standard colors 212' as described with respect to FIG. 2. The color picker UI 300 also includes recent colors 305 most recently selected via the more colors entry point.

Recent colors 305 may be displayed on a "per document" basis. For instance, a different recent colors scheme may be displayed when as user switches to another presentation. However, if the presentation is saved, a user can open it up later, and it will have the same recent colors as the last time that presentation was used. Also, when all the recent colors slots are full, the recent color that was set the longest ago will be replaced. Designations such as 'Picture', 'Gradient', or 'Texture' show for the 'Fill' entry point and are UEX additions. The dialog UI 300' includes a "More Colors" link 307 that provides access to a dialog for accessing more colors.

Figure 4:
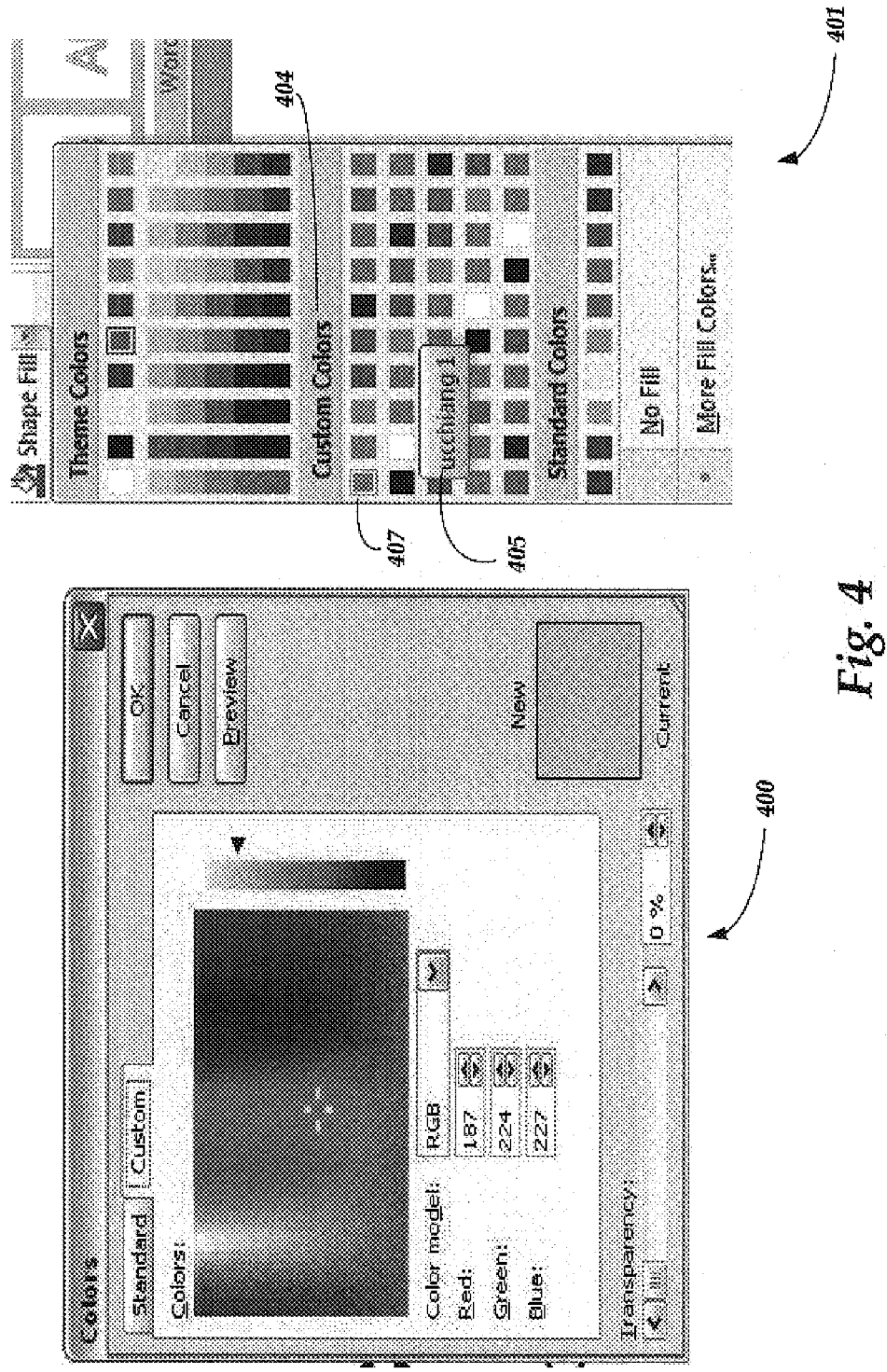
FIG. 4 illustrates another color picker UI rendering custom colors and tool tips.

FIG. 4 illustrates custom color creation UI 400 and another color picker UI 401 rendering established custom colors 404 and a tool tip 405. A design user (creating a style sheet) can create theme colors and/or custom colors that will show via the color picker UI 401. These colors can be of any color space (i.e. sRGB, scRGB, CMYK, etc). Each custom color can be given a custom name that shows the tool tips in the color picker UI 401. A selection marker 407 around a color option well illustrates which custom color is currently applied. Users can also preview new colors within the document before closing out the dialogue box by hovering over the desired color thereby entering a preview request. The color picker component provides a live preview that temporarily changes the document to render the potential color selection.

Figure 5:
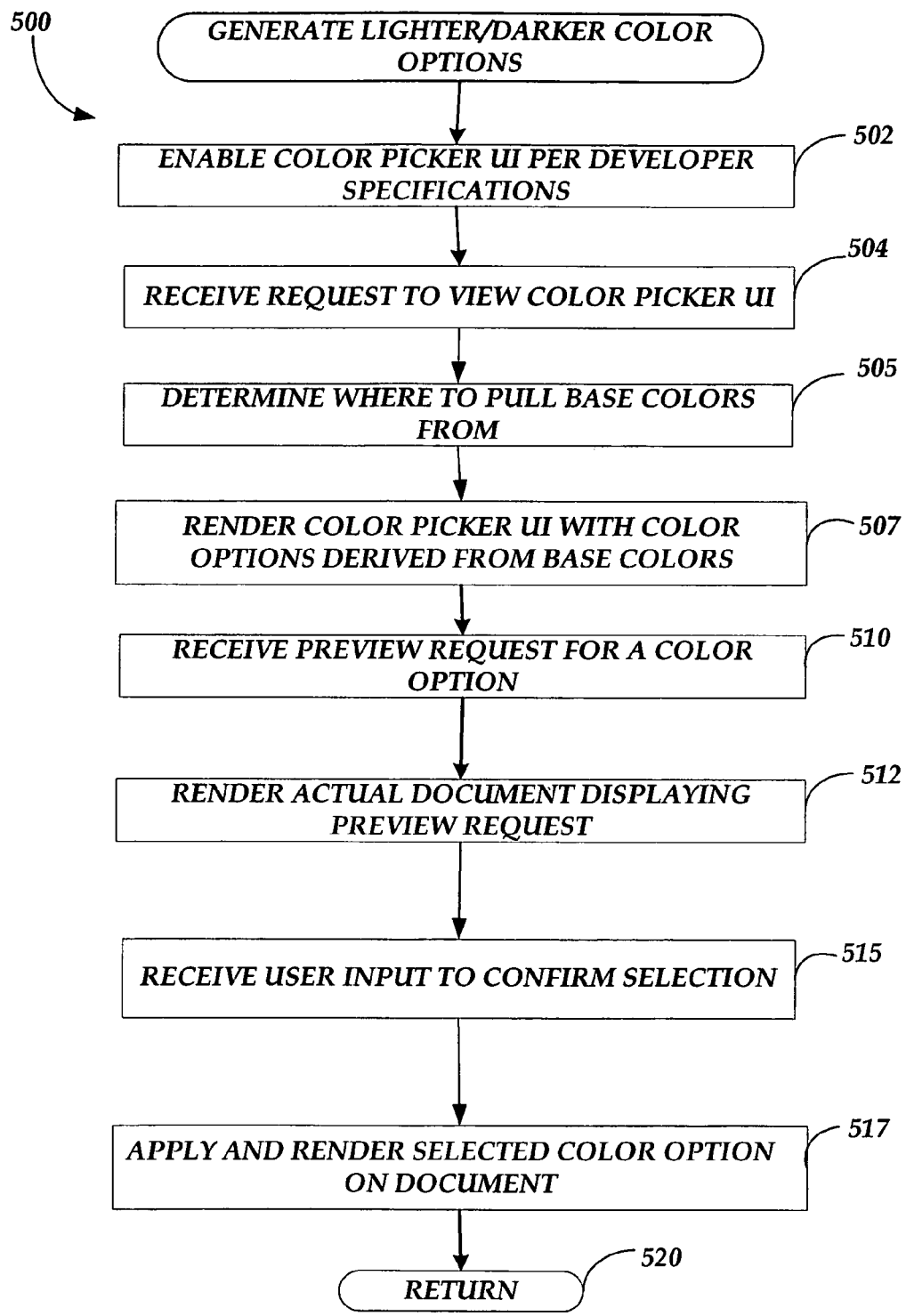
FIG. 5 is an illustrative routine performed in dynamically generating lighter and darker options from a base color scheme.

FIG. 5 is an illustrative routine 500 performed in generating lighter or darker color options from one or more base colors according to an embodiment of the present invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 5, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIGS. 1-5, the logical flow 500 begins at operation 502, where the computing device 100 enables the color picker UI per the developer of the entry point's specifications. Developer specifications may include designations as to whether the UI is a dropdown or dialog UI, whether the UI facilitates automatic retrieval of color options from the current color scheme, retrieval of color options from a style sheet or other sources, and/or whether the UI includes a rendering of a no fill, no line, and/or a no color (no fill/line/color) option and/or a more colors option.

Next at operation 504, the computing device 100 receives an end product user request to view the color picker UI. Then at operation 505 the computing device 100 determines where to pull base colors from for the document to which color is to be applied. At operation 507, the computing device 100 derives lighter color options and/or darker color options from one or more base colors associated with the current base color scheme. Once the lighter and/or darker variants are calculated or derived, the computing device 100 renders the color picker UI via the display device 123 including the lighter color options and/or the darker color options derived from the base colors associated with the current color scheme at operation 507. It should be appreciated that the current color scheme includes color options that definitively compliment one another.

Next at operation 510, the computing device 100 receives a preview request for a lighter or darker color option. Then at operation 512, the computing device renders a preview of the document including the lighter or darker color option requested before storing the request as applied. At operation 515, the computing device receives a user input to confirm selection of the previewed color option. Then at operation 517, the computing device 100 applies, or forwards notification to apply, and renders the selected color option on the document. The logical flow 500 the returns control to other routines at return operation 520.

Thus, the present invention is presently embodied as methods, systems, computer program products or computer readable mediums encoding computer programs for generating lighter or darker color options from one or more base colors.

It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A computer-implemented method for generating lighter or darker color options from one or more base colors to apply to a document, comprising:
   enabling a color picker user interface (UI) according to developer specifications;
   receiving a user request to view the color picker UI;
   determining a current base color scheme for the document;
   deriving at least one of lighter color options or darker color options from one or more base colors associated with the current base color scheme, wherein the derived at least one of lighter color options or darker color options are variants of the one or more base colors and are similar to one or more colors already displayed in the document; and
   rendering the color picker UI including at least one of the lighter color options or the darker color options derived from the base colors associated with the current base color scheme.

2. The method of claim 1, further comprising:
   receiving a preview request for at least one of the lighter or darker color options; and
   rendering a preview of the document including the lighter or darker color option requested before storing the request as applied.

3. The method of claim 1, further comprising:
receiving a selection of a lighter or darker option to apply to the document; and
forwarding notification to apply the selection to the document.

4. The method of claim 1, wherein enabling the color picker UI according to developer specifications comprises at least one of the following:
specifying one of a drop down UI or a dialog UI;
specifying one of automatic retrieval of color options from a style sheet or retrieval of color options from some other source; and
specifying a rendering of a no fill/line/color option or a more colors option.

5. The method of claim 4, further comprising:
receiving a selection of the more colors option;
receiving a selection of a color via the more colors option; and
recording and rendering a most recently used color when a color is selected via the more colors option.

6. The method of claim 1, wherein deriving at least one of lighter color options or darker color options from one or more base colors comprises at least one of the following:
calculating a lighter variant of each base color option by:
converting an original RGB base color to a first luminance value; subtracting the first luminance value from a value of 255;
multiplying a resulting difference between the value of 255 and the first luminance value by an inverse to a percentage of lightness desired;
adding the first luminance value to a resulting product of the resulting difference and the inverse to produce a second luminance value; and
converting the second luminance value back to a new RGB value representing a lighter color; and
calculating a darker variant of each base color option by:
converting the original RGB base color to the first luminance value;
multiplying the first luminance value by an inverse to a percentage of the darkness desired;
subtracting a product of the first luminance value and the inverse from the first luminance value to produce a third luminance value; and
converting the third luminance value back to a new RGB value representing a darker color.

7. The method of claim 6, wherein when base color luminance is less than 0.2 or greater than 0.8 deriving at least one of lighter color options or darker color options from one or more base colors:
calculating all darker variants when the base color luminance is greater than 0.8; and
calculating all lighter variants when the base color luminance is less than 0.2.

8. The method of claim 1, further comprising:
defining and rendering one or more custom color options via the color picker UI;
rendering one or more standard colors via the color picker UI; and
rendering at least one of an RGB value of a custom color option or a name of the custom color option when detecting a hover over the custom color option in the color picker UI.

9. A computer program product comprising a computer-readable medium having control logic stored therein for causing a computer to generate lighter or darker color options from one or more base colors to apply to a document, the control logic comprising computer-readable program code for causing the computer to:
receive a user request to view a color picker user interface (UI);
determine a current base color scheme for the document;
derive at least one of lighter color options or darker color options from one or more base colors associated with the current base color scheme, wherein the derived at least one of lighter color options or darker color options are variants of the one or more base colors and are similar to one or more colors already displayed in the document; and
render the color picker UI including at least one of the lighter color options or the darker color options derived from the base colors associated with the current base color scheme.

10. The computer program product of claim 9, further comprising computer-readable program code for causing the computer to enable the color picker UI according to user specifications prior to receiving the user request.

11. The computer program product of claim 9, further comprising computer-readable program code for causing the computer to:
receive a preview request for at least one of the lighter or darker color options; and
render a preview of the document including the lighter or darker color option requested before storing the request as applied.

12. The computer program product of claim 9, further comprising computer-readable program code for causing the computer to:
receive a selection of a lighter or darker color option to apply to the document; and
apply the selection to the document.

13. The computer program product of claim 10, wherein the computer-readable program code for causing the computer to enable the color picker UI according to developer specifications comprises computer-readable program code for causing the computer to at least one of the following:
specify one of a drop down UI or a dialog UI;
specify one of automatic retrieval of color options from a style sheet or retrieval of color options from some other source; and
specify a potential rendering of a no fill/line/color option or a more colors option.

14. The computer program product of claim 13, further comprising computer-readable program code for causing the computer to:
receive a selection of the more colors option;
receive a selection of a color via the more colors option; and
record and render a most recently used color when a color is selected via the more colors option.

15. The computer program product of claim 9, wherein the computer-readable program code for causing the computer to derive at least one of lighter color options or darker color options from one or more base colors comprises computer-readable program code for causing the computer to at least one of the following:
calculate a lighter variant of each base color option by causing the computer to:
convert an original RGB base color to a first luminance value; subtract the first luminance value from a value of 255;

multiply a resulting difference between the value of 255 and the first luminance value by an inverse to a percentage of lightness desired;

add the first luminance value to a resulting product of the resulting difference and the inverse to produce a second luminance value; and convert the second luminance value back to a new RGB value representing a lighter color; and calculate a darker variant of each base color option by causing the computer to:

convert the original RGB base color to the first luminance value;

multiply the first luminance value by an inverse to a percentage of the darkness desired;

subtract a product of the first luminance value and the inverse from the first luminance value to produce a third luminance value;

convert the third luminance value back to a new RGB value representing a darker color.

16. The computer program product of claim 9, wherein when base color luminance is less than 0.2 or greater than 0.8, the computer-readable program code for causing the computer to derive at least one of lighter color options or darker color options from one or more base colors comprises computer-readable program code for causing the computer to:

calculate all darker variants when the base color luminance is greater than 0.8; and calculate all lighter variants when the base color luminance is less than 0.2.

17. The computer program product of claim 9, further comprising computer-readable program code for causing the computer to:

define and render one or more custom color options via the color picker UI; render one or more standard colors via the color picker UI; and render at least one of an RGB value of a color option or a name of a color option when detecting a hover over a color option well associated with the color option.

18. A method in a computer system for displaying on a display device a color picker user interface (UI), the color picker UI including a plurality of theme colors derived from one or more base colors, the method comprising:

receiving an indication that the color picker UI is to be displayed using at least one of the following:
a drop down UI or a dialog UI;
automatic retrieval of color options from a style sheet or retrieval of color options from some other source; and
rendering of a no fill/line/color option or a more colors option;

determining a current base color scheme for the color picker UI;

deriving at least one of lighter color options or darker color options from one or more base colors associated with the current base color scheme;

displaying on the display device, in accordance with the received user indication, the color picker UI including at least one of the lighter color options or the darker color options derived from the base colors associated with the current base color scheme;

defining and displaying one or more custom color options in the color picker UI via the display device;

displaying via the display device one or more standard colors in the color picker UI; and displaying via the display device at least one of an RGB value of a custom color option or a name of the custom color option when detecting a hover over the custom color option in the color picker UI.

19. The method of claim 18, further comprising:

receiving a selection of a lighter or darker option to apply to a document; and displaying the document with the selection applied.

* * * * *